Nov. 24, 1925.  
E. T. SMITH  
1,562,596  
VALVE OPERATING MECHANISM  
Filed March 6, 1922  
4 Sheets-Sheet 1

Nov. 24, 1925.

E. T. SMITH

VALVE OPERATING MECHANISM

Filed March 6, 1922

Inventor
Emory T. Smith

Nov. 24, 1925.　　　　　　　　　　　　　　　　　1,562,596
E. T. SMITH
VALVE OPERATING MECHANISM
Filed March 6, 1922　　　　4 Sheets-Sheet 3

Nov. 24, 1925.
E. T. SMITH
1,562,596
VALVE OPERATING MECHANISM
Filed March 6, 1922     4 Sheets-Sheet 4
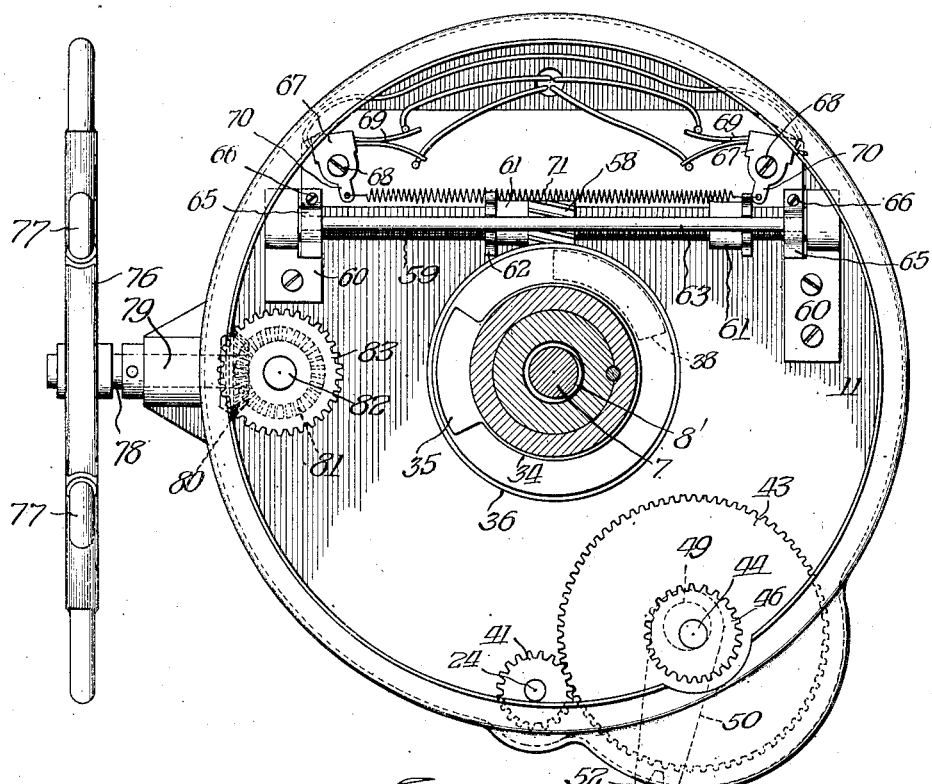
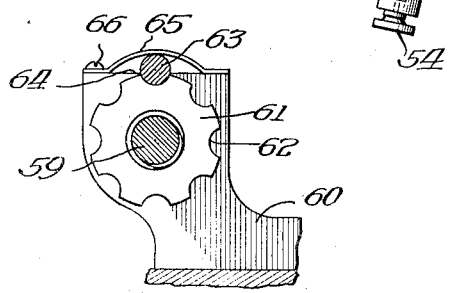

Patented Nov. 24, 1925.

1,562,596

UNITED STATES PATENT OFFICE.

EMORY T. SMITH, OF LUDLOW, MASSACHUSETTS, ASSIGNOR TO THE CHAPMAN VALVE MANUFACTURING COMPANY, OF INDIAN ORCHARD, MASSACHUSETTS, A CORPORATION OF MASSACHUSETTS.

VALVE-OPERATING MECHANISM.

Application filed March 6, 1922. Serial No. 541,620.

*To all whom it may concern:*

Be it known that I, EMORY T. SMITH, a citizen of the United States, and a resident of town of Ludlow, in the county of Hampden and State of Massachusetts, have invented certain new and useful Improvements in Valve-Operating Mechanism, of which the following is a specification.

This invention relates to power transmission means, and more particularly to an improved means for operating valves, and the like.

While this invention is particularly adapted for use in operating valves and other devices to which a limited movement is to be given, and, as a matter of convenience in illustration, is shown as embodied in a structure for operating a valve, it will be understood that it has a wide field of utility for other purposes.

Among the more important objects and features of this invention are: the embodiment in a unit structure of means for operating various types, arrangements and sizes of valves and other mechanisms; the embodiment in a structure of means whereby the valve, or the like, may be operated manually or by other power; the arrangement of the manual and power actuated driving means wherein a motor, limit control means therefor, and manual means are all embodied in a structure which is compact, possesses strength and rigidity, and as a complete power transmission unit may be associated with any one of various types of valves, whether rotary or reciprocable without material modification of the valve or other structure; the complete housing of the power transmission mechanism to protect the same against damage and the operator against injury; the facility with which the various parts of the device may be reached for repair or replacement; the embodiment in a device of this character of an arrangement whereby assembly and dissembly of the parts may be quickly and facilely accomplished; and the novel means for operatively connecting the motor and transmission mechanism or for disconnecting the same, whereby the valve or other device may be manually operated when necessary or desirable independently of the motor and its associated driving elements.

Additional objects and features of utility and improvement reside in the particular embodiment illustrated and are: the mounting of the motor externally of the other parts of the device yet upon the support for the same whereby the motor, while not destroying the unity of the structure, is rendered readily accessible for repair or removal in order to reduce to a minimum the period of retirement of the valve or other device from service when repairs are required; the generally dust-proof casing for the power transmission means and associated parts; the simplicity of the control for effecting connection and disconnection of the motor to the transmission means; and the generally new functions performed by the device developing from the improved form of lost motion connection between the transmission mechanism and the driven element whereby the motor is permitted to get up to speed before having the load placed thereon.

The foregoing, as well as such further objects and additional benefits and advantages as may hereinafter appear or be pointed out, I attain by means of a construction, one embodiment of which is illustrated in the accompanying drawings wherein:—

Figure 3 is an enlarged sectional view in plan taken on the line 3—3 of Figure 1, looking in the direction indicated by the arrows;

Figure 4 is a fragmentary horizontal sectional view taken on the line 4—4 of Figure 1, looking in the direction indicated by the arrows;

Figure 5 is an enlarged fragmentary sectional view taken on the line 5—5 of Figure 3; and Figure 6 is an enlarged horizontal sectional view of a modified form of this invention.

Figure 1:
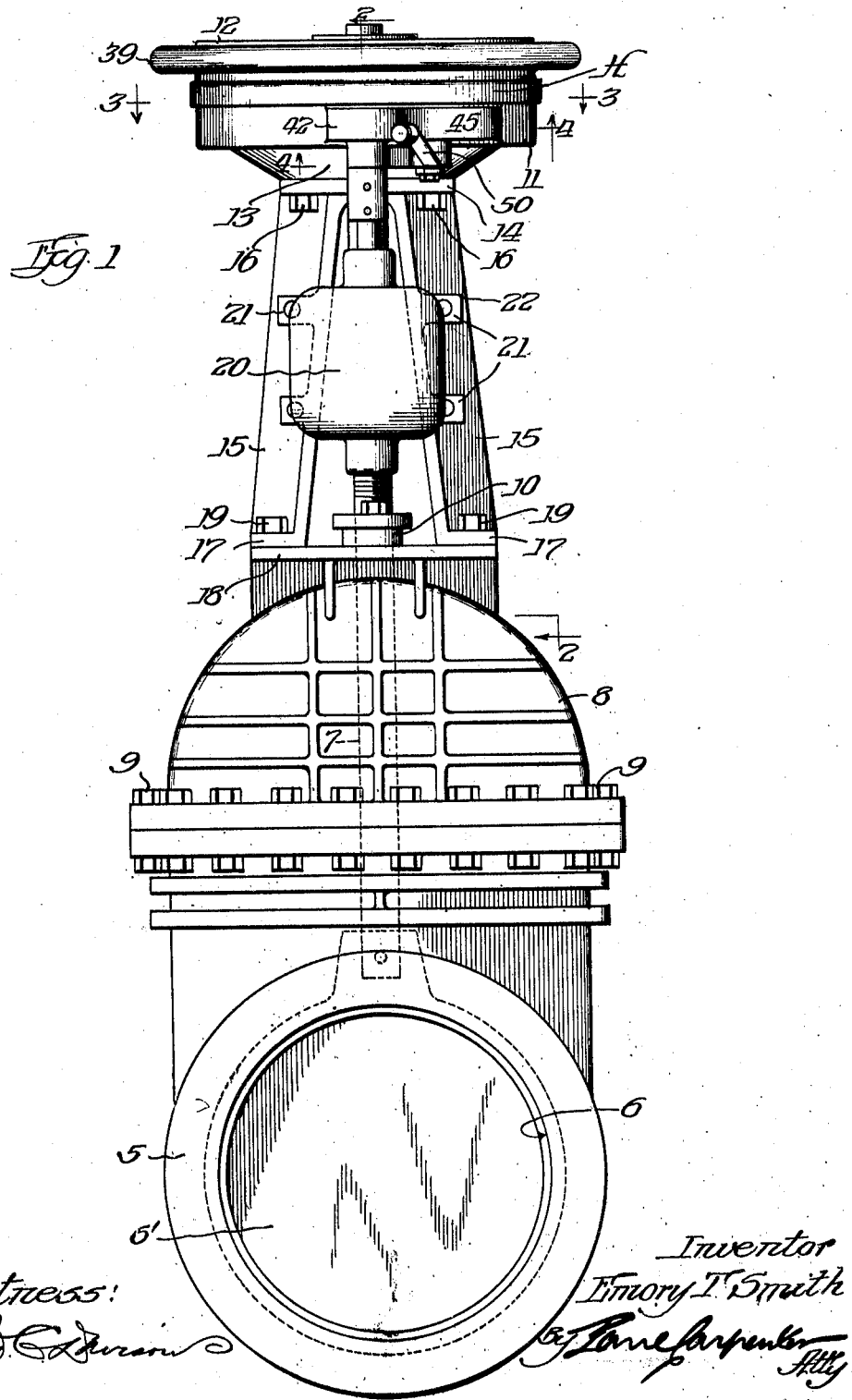
Figure 1 is a side elevational view of a device including the improvements of this invention.

Referring now in detail to the drawings, wherein this invention is embodied in a structure particularly adapted for operating valves, and is shown as applied to a valve of the well-known gate type, 5 is the valve casing, this casing having the usual port 6 across which is slidable the blade of the valve 6', this valve being carried on one end of an operating member, such as a valve stem 7, which extends upwardly through the center of the valve casing 5 into and through the top of the detachable head 8 secured to the casing 5 by the bolts 9. The valve stem 7 extends through a fluid tight packing gasket 10 mounted on the top of the head 8 and is provided with a threaded portion 8' beyond the head 8.

The structure so far described is that usually embodied in any sliding gate valve, and as previously pointed out one of the objects of the invention is to mount the valve operating device as a unit upon the valve casing and to afford means for opening and closing the valve, either manually or by means of a motor. To this end the structure to be described hereinafter has been designed.

As shown generally in Figure 1, the invention includes a housing H composed of the lower portion 11 and the upper portion 12, which housing contains the power transmission gearing and clutch means for controlling the same. The lower portion 11 is provided with a depending substantially circular enlargement 13 which seats upon a similarly formed head 14 carried by the standard which comprises the flanged divergent legs 15—15. Bolts 16—16 extend through the head 14 into suitably threaded recesses in the bottom face of the enlargement 13, thus fixedly mounting the housing upon the legs 15. The legs 15 are provided with foot portions 17 which are of suitable breadth to engage evenly the upper surface of the platform 18 usually cast integrally the head 8, suitable bolts 19—19 extending through the foot portions 17 into the platform 18 for fixedly connecting the standard comprising the legs to the valve casing. Thus the housing for the transmission gearing, to be presently described, is rigidly disposed on the valve casing.

The power operating means for the device of this invention is preferably an electric motor 20, the casing of which is provided with feet 21—21 for securement to lugs 22—22 formed in complemental pairs on the legs 15 so as to support the motor directly upon the legs about midway of the length of the same. The motor shaft 23 extends parallel to the valve stem 7, but to one side of the enlargement 13, said shaft 23 being connected to a shaft 24, which extends from the portion 11 of the housing, by means of a sleeve 25. Of course, any other suitable means may be provided for connecting the shafts 23 and 24.

Transmission gearing is contained in the housing H composed of the sections 11 and 12, the former section being fixedly mounted on the standard and the latter being rotatable and connected operatively with the threaded part 8' of the valve stem through a lost motion connection for imparting rectilinear movement thereto within certain limits. The connection between the section 12 of the housing and the threaded part of the valve stem preferably includes a sleeve 26 provided with an internally threaded bore 27 which engages the valve stem, the sleeve being separate from and rotatably mounted in a vertically extending axial hub 28, preferably cast integrally with the top section 12 of the housing. Thus the sleeve 26 is rotatable relative the hub 28 through certain limits governed by the lost motion arrangement to be presently described.

The bottom portion 11 of the housing is provided with an upstanding axial hub 29 which extends to a point about midway of the sleeve 26, but in spaced relation to the lower end of the hub 28. The sleeve is freely rotatably mounted in the hub 29 and is retained against longitudinal movement in either of the lugs 28 and 29 by means of a collar 30 which encircles the upper projecting end of the sleeve and is secured thereto by key screws 31, and a second collar 32 which is threaded to the lower end of the sleeve and lies in an annular recess 33 formed in the base of the portion 11.

Between the adjacent ends of the hubs 28 and 29 a laterally extending annular flange 34 is provided, having a segmental lug 35 formed integrally therewith and with the sleeve 26. A worm 36 is secured to the flange 34 by means of screws 37, said worm lying between the upper end of the hub 29 and said flange 34, and performing a function which will presently appear. The lower end of the hub 28 is provided with a segmental lug 38, shown in dotted lines in Figure 3, and arranged in the plane of the lug 35, these lugs or abutments being adapted to engage, when motion is imparted to the upper section 12 of the housing, either manually or by the power transmission gearing from the motor as will appear presently.

To the end that the necessary rotary motion may be manually imparted to the upper section 12 of the housing, the latter is provided with a hand-wheel 39 integrally cast with the upper section 12 through the medium of webs 40.

The transmission gearing which comes into play when the motor is used preferably comprises a pinion 41 mounted on the upper end of the stub-shaft 24 within an enlarged chamber 42 formed integrally with the bottom section 11, this pinion 41 being adapted for meshing engagement with a relatively large gear 43 mounted upon a laterally shiftable shaft 44, another enlarged segmental chamber 45 being formed on the section 11 to accommodate said gear 43. The shaft 44 carries on its upper end a pinion 46 which is adapted for meshing engagement with the internal ring-teeth 47 formed on the wall 48 of the upper section 12 of the housing H. The shiftable shaft 44 is in the nature of a trunnion and is eccentrically mounted upon a bearing stud 49 which extends through a bearing in the bottom wall of the lower section 11, this stud being eccentric to the shaft 44 but concentric with the segmental face of the chamber and receiving on the lower free end a lever arm 50. The free end of the lever 50 is provided with an upstanding lug 51 which is bored to receive a locking plunger 52, this locking plunger being restrained against outward movement by a helical spring 53 which surrounds the plunger, the plunger carrying a knob 54 by which the same may be withdrawn from engagement with one or the other of the apertures 55 and 56 formed in the segmental wall of the chamber 45. Thus by shifting the lever arm from one position to another, the pinion 46 may be engaged and disengaged with the teeth 47. In this manner the motor may be readily disconnected from the rotatable part of the housing H when it is desired to manually operate the valve, or when the motor is disabled, it being seen that when the motor is driving, the shaft 24 is connected to the upper section 12 through the transmission gearing.

Figure 2:
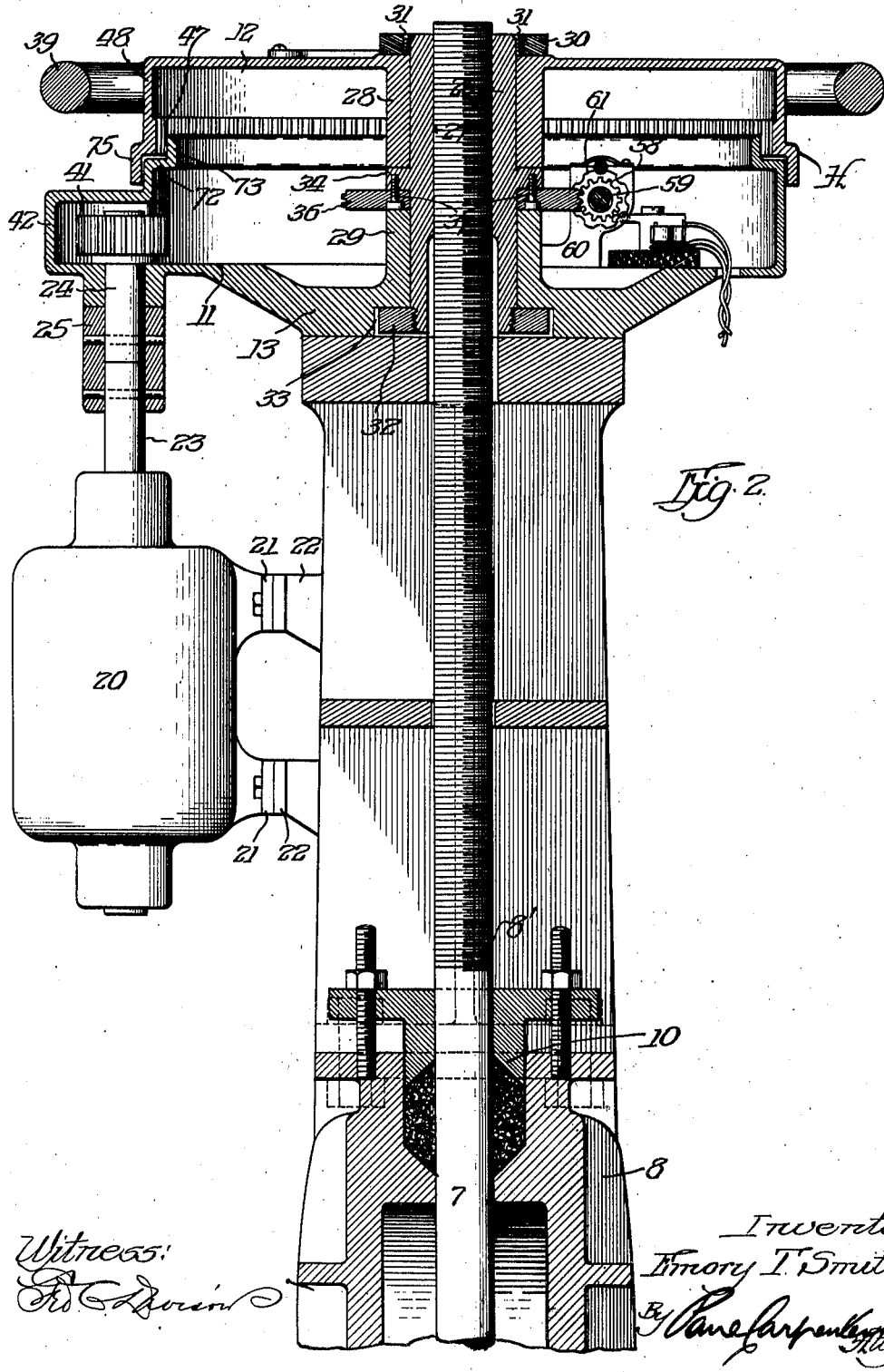
Figure 2 is an enlarged vertical sectional view, taken on the plane of line 2—2 of Figure 1, looking in the direction indicated by the arrows.

I provide means for controlling the motor circuit within certain limits, this means being operated by the worm 36 and comprising a worm gear 58 in meshing engagement with the worm and mounted upon the medial portion of the screw-rod 59 and rotatable therewith, which rod is mounted at its ends in bearings 60—60 carried by the base of the housing section 11. A pair of nut stops 61 are mounted upon and in threaded engagement with the rod 59, these nuts having each a plurality of notches 62 for receiving guide-rod 63, this guide-rod preventing turning of said nuts and extending above and parallel with the screw-rod 59 and seating at its ends in recesses 64—64 formed in the upper faces of the bearings 60—60. As best shown in Figure 2, the guide-rod is retained against accidental displacement by flat spring strips 65—65 having each one free end riveted at 66 to the bearing thereof. A pair of blocks 67 are pivoted at 68 on an insulated base on the section 11, near the bearings 60, and pairs of circuit controlling elements 69 are carried by said blocks. The blocks have extensions 70—70 connected by a contractile helical spring 71, and said extensions are disposed in the path of movement of the respective stop nut therefor, so that when the nut for either of said circuit controllers strikes same the motor circuit is broken. The relative positions of the nuts 61 on the screw-rod may be varied by releasing one end of the guide-rod 63 and rotating one or the other of the nuts on the screw-rod, and then returning the guide-rod to position.

The lower section 11 and the upper section 12 of the housing have a dust proof junction preferably comprising an annular horizontal flange 72 on the section 11 and an upturned flange 73, which latter lies within the wall 48 of the section 12 and cooperates therewith to prevent the entrance of foreign matter into the housing. The wall 48 of the upper section 12 is likewise provided with a depending annular flange 75 which lies outside the annular wall of the portion 11 to close the space between this wall and the wall 48. The flanges 72 and 73 are interrupted at 74 to permit the pinion 46 to engage the teeth 47 on the section 12.

In Figure 6, a modified form of this invention is illustrated, the modification having to do particularly with the manual means for operating the gate valve when the motor is disconnected. Here the manual operating means comprises a hand wheel 76 provided with projecting spokes 77, and carried by a radially disposed short shaft 78. The shaft 78 is mounted in a bearing 79, preferably cast integrally with the lower portion 11 of the housing H, although this bearing might be otherwise attached to the portion 11. The shaft 78 is of sufficient length to place the hand wheel 76 clear of the hand wheel 39, but, of course, the element 39 may, if desired, be omitted in this form of the invention.

The shaft 78 extends into the housing H, and is provided with a bevel pinion 80, which is in meshing engagement with the bevel gear 81. The gear 81 is fixedly secured to a vertical shaft 82, which shaft is rotatably mounted in a bearing (not shown) provided in the bottom wall of the lower section 11. The shaft 82 supports a pinion 83 for rotation with said shaft, and this pinion 83 is in permanent meshing engagement with the ring gear teeth 47, formed on the upper section 12 of the housing. When the hand wheel 76 is rotated the pinion 83 imparts rotation to the upper section of the housing and thus manual operation of the valve may be readily had. The hand wheel, it will be noted, gives an increased leverage, and may be used in lieu of the element 39 or used therewith as an alternative manual operating means. The remaining elements shown in Figure 6 are identical with those already described.

From the foregoing specification it will thus be seen that the element 48, which is part of the transmission mechanism and is preferably made integral with the hand wheel 39, is so constructed as to form the upper half of the casing enclosing the transmission mechanism and is so associated with the motor as to be connectible therewith and disconnectible therefrom so that the motor drive in fact picks up the manual drive and operates the drive therethrough.

Having thus described my invention and illustrated its use, what I claim as new and desire to secure by Letters Patent is—

1. A power driven operating unit for valves and the like including a standard having a housing including a movable part, manual operating means affixed to and movable with a part of said housing, valve operating mechanism in said housing, a motor carried by said standard and having driving connection with said operating mechanism, and an auxiliary manual valve operating device supported by a stationary part of said housing.

2. In motion transmitting means, a unit device comprising a standard, a casing supported thereby including relatively movable parts, one of which is rotatable, an element to be driven, driving means including transmission mechanism manually operated means for disconnecting said mechanism and said element contained in said casing, said transmission mechanism including a ring gear on the rotatable part of said casing, auxiliary reduction gearing, and auxiliary manual operating means disposed externally of the casing and in operative connection with and for driving said ring gear through said auxiliary reduction gearing.

3. A power transmission unit, having, in combination, a substantially closed casing, a part of said casing being rotatable, an element to be moved, operating mechanism therefor, including a hand wheel and a reduction gearing wholly contained in said casing and connecting said hand wheel to said rotatable part of said casing, and a power driven means for operating said power transmission unit.

4. A power transmission unit, having, in combination, a substantially closed casing, a part of said casing being rotatable, an element to be moved, operating mechanism therefor, including a hand wheel and a reduction gearing wholly contained in said casing and connecting said hand wheel to said rotatable part of said casing, and a power driven means for operating said element to be moved.

5. In a device of the character described, in combination, an element to be driven, a motor, manual operating means connected to and forming a part of said element to be driven, a disconnectible connection between said means and the motor, and auxiliary manual operating means for connection to the element to be driven.

6. In a device of the character described, in combination, an element to be driven, a motor disconnectibly connected to said element to be driven, manual operating means for said element to be driven and serving to connect the motor to said element to be driven, and auxiliary manual means for connection to the element to be driven.

7. In a device of the character described, in combination, an element to be driven, a motor, manual operating means for said element to be driven, a disconnectible connection between said means and the motor, and auxiliary manual operating means for connection to the element to be driven and including a hand wheel extending laterally from said element to be driven.

8. A power transmission unit, having, in combination, a substantially closed casing, a part of said casing being rotatable, an element to be moved, operating mechanism therefor, including a hand wheel fixed to said rotatable part of said casing, and a power driven means for operating said element to be moved, a shaft extending laterally with respect to the element to be driven, a hand wheel mounted on said shaft and reduction gearing connecting said shaft to said element to be driven.

9. In a device of the character described, a casing, one of the parts of said casing forming an element to be driven, a motor mounted adjacent to said casing, manual operating means on the movable part of said casing, and auxiliary manual operating means on the stationary part of said casing.

10. A power driven operating unit for valves and the like including a standard having a housing, manual operating means affixed to a part of the housing, valve operating mechanism in said housing, a motor carried by said standard and having driving connection with said operating mechanism, and an auxiliary manual valve operating device supported by a stationary part of said housing.

In testimony whereof I have hereunto signed my name.

EMORY T. SMITH.